United States Patent [19]
Suzuki et al.

[11] Patent Number: 5,812,592
[45] Date of Patent: Sep. 22, 1998

[54] SPREAD SPECTRUM COMMUNICATION APPARATUS UTILIZING A PHASE DIFFERENCE BETWEEN TWO SIGNALS

[75] Inventors: Rie Suzuki; Toshihiko Myojo; Norihiro Mochizuki, all of Yokohama, Japan

[73] Assignee: Canon Kabushiki Kaisha, Tokyo, Japan

[21] Appl. No.: 569,462

[22] Filed: Dec. 8, 1995

[30]    Foreign Application Priority Data

Dec. 13, 1994 [JP] Japan .................................... 6-332714

[51] Int. Cl.⁶ .................................................. H04B 1/707
[52] U.S. Cl. .......................................... 375/206; 375/208
[58] Field of Search ................................. 375/200, 206, 375/208, 209, 210

[56]    References Cited

U.S. PATENT DOCUMENTS

| | | | |
|---|---|---|---|
| 4,875,221 | 10/1989 | Mori | 375/208 |
| 5,090,023 | 2/1992 | Watanabe et al. | 375/208 |
| 5,260,969 | 11/1993 | Kato et al. | 375/200 |
| 5,313,490 | 5/1994 | Schramm et al. | 375/206 |
| 5,426,666 | 6/1995 | Kato | 375/200 |
| 5,452,327 | 9/1995 | Barham et al. | 375/208 |
| 5,495,509 | 2/1996 | Lundquist et al. | 375/367 |

*Primary Examiner*—Stephen Chin
*Assistant Examiner*—Jeffrey W. Gluck
*Attorney, Agent, or Firm*—Morgan & Finnegan LLP

[57]    ABSTRACT

A spread spectrum reception apparatus generates a local reference code and a timing signal having ½ the period of the reference code. Correlation calculation between a received spread spectrum signal and the local reference code is performed. Upon reception of the correlation calculation result, a peak detector detects a correlation peak signal. The rate of a code generation clock is adjusted in accordance with the phase difference between the timing signal and the correlation peak signal to perform de-spread processing of the received signal.

17 Claims, 16 Drawing Sheets

SPREAD SPECTRUM COMMUNICATION APPARATUS UTILIZING A PHASE DIFFERENCE BETWEEN TWO SIGNALS

BACKGROUND OF THE INVENTION

1. Field of the Invention

The present invention relates to a spread spectrum communication apparatus.

2. Description of the Related Art

FIG. 15 is a block diagram showing the arrangement of the synchronization unit of a conventional receiver used for spread spectrum communication.

The receiver causes a demodulation unit 3 to de-spread a spread spectrum signal S1 received through an antenna 1 by using a de-spread signal S2 output from a synchronization unit 2, thereby extracting information.

The synchronization unit 2 inputs the spread spectrum signal S1 to a SAW convolver 4 to perform correlation calculation with a local reference-signal S3B. The local reference-signal S3B uses a signal $\overline{PN0}$—a signal obtained by inverting the sync spread code PN0 on the time base-obtained by time-inverting the same code as a sync spread code PN0 contained in the received signal. The output from the SAW convolver 4 is obtained as a correlation output S4 through a detector 5.

A PLL (phase-locked loop) 7 adjusts the rate of a code generation clock S7 in accordance with the phase difference between an output S5 from a peak detection unit 6 which detects a peak of the correlation output S4 and a code generation timing signal S6 from a code generator 8.

When identified codes having code sequence length L are input to the right and left terminals of the SAW convolver 4, a correlation peak appears at a period L/2. For this reason, as shown in FIG. 16, in the conventional synchronization scheme for spread spectrum communication which uses the SAW convolver, the local reference-signal S3B obtained by performing information conversion of the sync spread code PN0 with "0" and "1" alternately for every period is used to eliminate these L/2 peaks, thereby causing a correlation peak S4 to appear at a period L.

When performing spread spectrum communication by forming information into a frame, a transmission signal generally includes a preamble interval 61 in which only a sync spread code is transmitted, as shown in FIG. 9. The PLL 7 in the conventional receiver in FIG. 15 is designed to establish code synchronization in this preamble interval 61 at a high rate.

In the above prior art, however, if the codes PN0 and $\overline{PN0}$ are out of phase with each other, and their phase difference is L/2, as shown in FIG. 17, the level of every correlation peak of the correlation output S4 which appears at the period L/2 is lowered to ½ because of information conversion of the local reference-signal S3B which is performed for each period, and does not exceed the threshold of the peak detection unit 6, as indicated by reference numeral 94 in FIG. 17. As a result, no signal is input to the PLL, and it may take much time to establish synchronization or locking.

As shown in FIG. 9, when transmitting information as a frame, if the preamble interval 61 for code synchronization is not sufficiently shorter than an information transmission time 62, the information transmission efficiency deteriorates in practice. In order to shorten the preamble interval 61, a high-rate, high-precision PLL is required, resulting in an increase in cost, further complication in arrangement, and the like.

SUMMARY OF THE INVENTION

It is an object of the present invention to improve a spread spectrum communication apparatus.

It is another object of the present invention to realize high-rate synchronization in spread spectrum communication.

It is still another object of the present invention to provide a spread spectrum communication apparatus which is resistant to noise and has excellent distance characteristics.

It is still another object of the present invention to improve the synchronization precision in spread spectrum communication.

It is still another object of the present invention to provide a spread spectrum communication suitable for transmission of information as a frame.

It is still another object of the present invention to provide a spread spectrum communication apparatus suitable for radio communication based on a multi-cell arrangement.

In one aspect, the present invention features a spread spectrum apparatus comprising a generating means for generating a reference code and a timing signal having a period ½ of a period of the reference code, a correlation means for obtaining correlation between a received signal and the reference code, a correlation means for obtaining correlation received signal accordance with the timing signal and a correlation output from the correlation means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

<First Embodiment>

Figure 1:
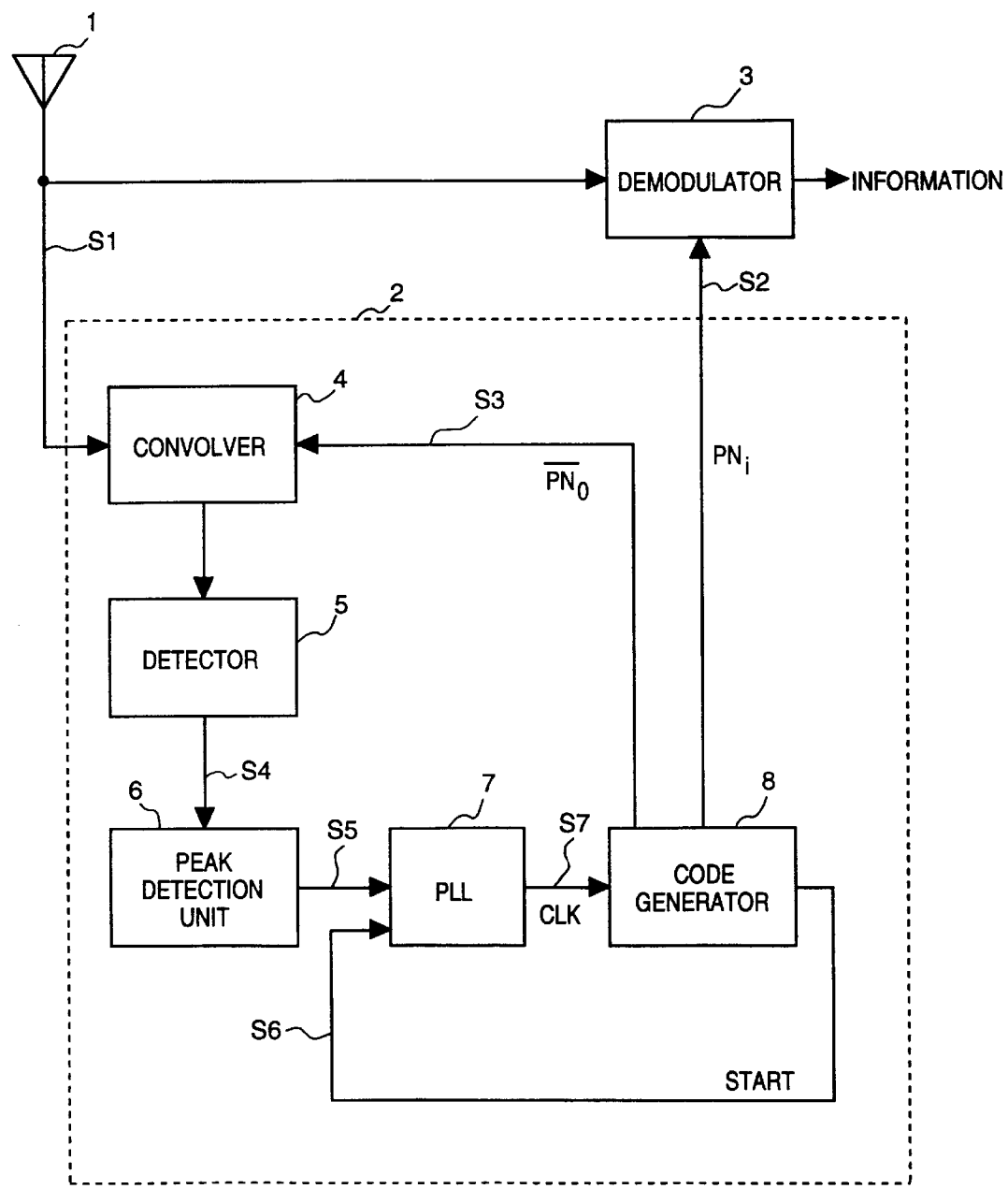
FIG. 1 is a block diagram showing the first embodiment of the present invention.

FIG. 1 is a block diagram showing the first embodiment of the present invention.

A receiver in this embodiment includes an antenna 1, a synchronization unit 2, and a demodulator 3.

The demodulation unit 3 de-spreads a spread spectrum signal S1 received by the antenna 1 by using a de-spread signal S2 received through the synchronization unit 2, and extracts information.

In the synchronization unit 2, a SAW (surface acoustic wave) convolver 4 performs correlation calculation between the received signal S1 and a local reference-signal S3. A detector 5 detects the output from the SAW convolver 4.

A peak detection unit 6 receives an output S4 from the detector 5 and detects a correlation peak signal S5. A PLL (phase-locked loop) 7 adjusts the rate of a code generation clock S7 in accordance with the phase difference between the correlation peak signal S5 and a code generation timing signal S6 from a code generator 8. Note that PLL 7 is generally constituted by a phase comparator, a loop filter, and a voltage-controlled oscillator.

The code generator 8 generates a de-spread code PNi having a code sequence length L and a local reference-signal $\overline{PN0}$ having a code sequence length 2L by using the same clock. In this case, the signal $\overline{PN0}$ is a code obtained by inverting the signal PN0 on the time base, and the signal PN0 is a sync code contained in the received signal S1. The code generation timing signal S6 indicates, e.g., the start portion of the code sequence of the de-spread signal S2 (PNi), and also indicates the start portion and the ½ position of the code sequence of the local reference-signal S3.

Figure 2:
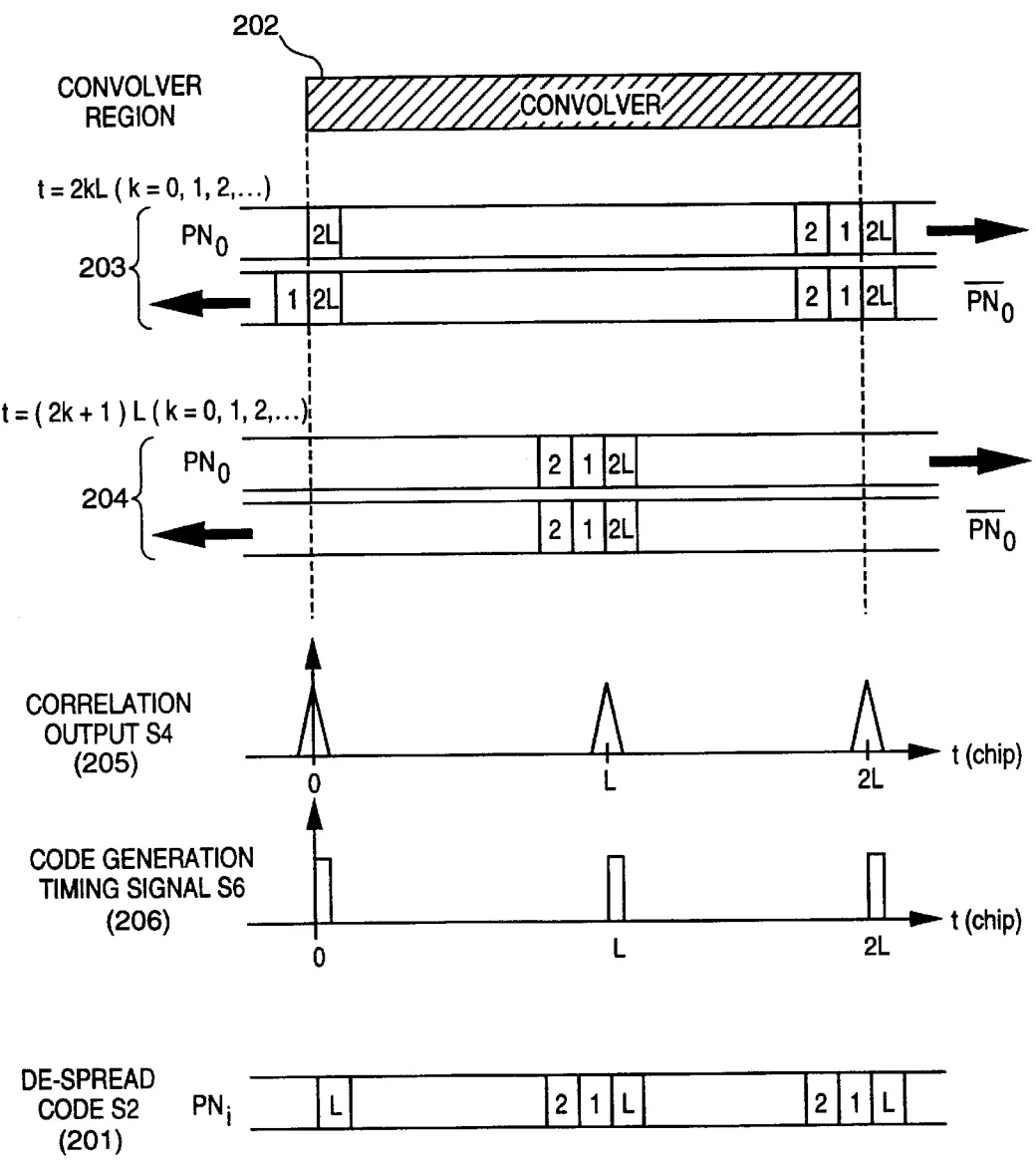
FIG. 2 is a timing chart showing the waveforms of signals in the first embodiment in a case wherein code synchronization is established.

FIG. 2 is a timing chart showing the waveforms of signals for a synchronization scheme in the first embodiment in a case wherein code synchronization is established.

The cross-correlation region of the SAW convolver 4 in this embodiment has a length 2L, as indicated by reference numeral 202, with respect to the code sequence length L of the de-spread signal S2 (PNi) denoted by reference numeral 201. For the sake of descriptive convenience, the leading edge of the code generation timing signal S6 is represented by t=0.

As shown in FIG. 2, when the signals are in phase with each other, t=2kL(k=0, 1, 2, . . . ), and the codes PN0 and $\overline{PN0}$ coincide with each other within the cross-correlation region of the SAW convolver 4, as indicated by reference numeral 203. In addition, as indicated by reference numeral 204, when t=(2k+1)L, the codes PN0 and $\overline{PN0}$ coincide with each other within the cross-correlation region of the SAW convolver 4. The correlation peak output S4 can therefore be obtained at the period L, as indicated by reference numeral 205. That is, the output S4 becomes a signal having the same period as that of the code generation timing signal S6 denoted by reference numeral 206.

Figure 3:
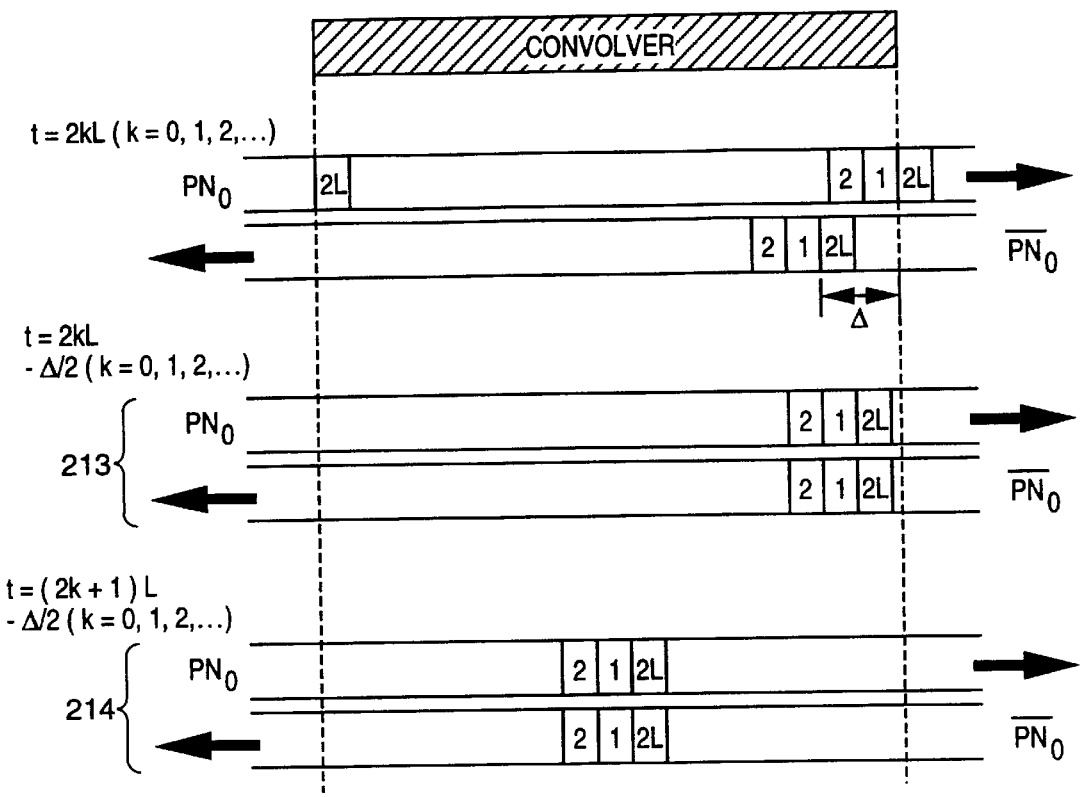
FIG. 3 is a timing chart showing the waveforms of signals in the first embodiment in a case wherein the signals are out of phase by an amount Δ.
Figure 3:
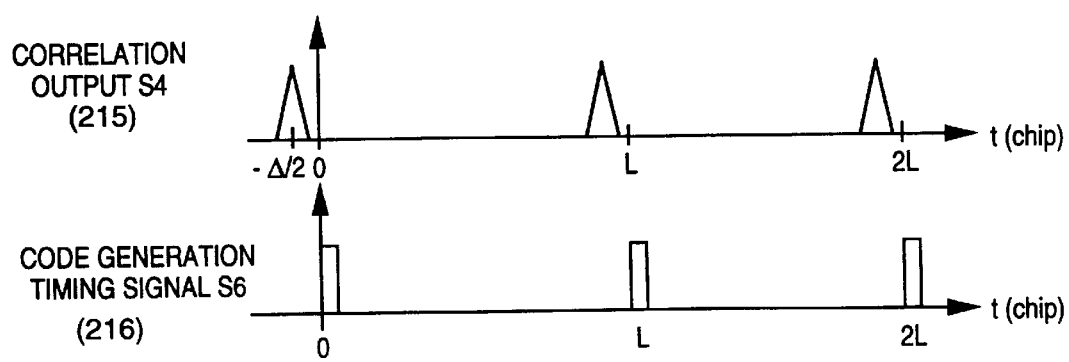
Figure 3:
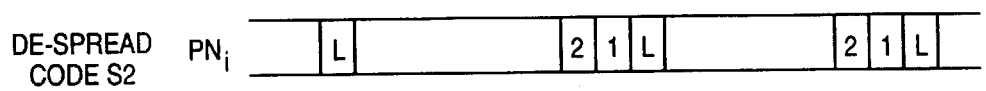

When the signals are out of phase by an amount Δ, as shown in FIG. 3, t=2kL-Δ/2(k=0, 1, 2, . . . ), and hence the codes PN0 and $\overline{PN0}$ coincide with each other within the cross-correlation region of the SAW convolver 4, as indicated by reference numeral 213. In addition, as indicated by reference numeral 214, when t=(2k+1)L-Δ/2, the codes PN0 and $\overline{PN0}$ coincide with each other within the cross-correlation region of the SAW convolver 4. As indicated by reference numeral 215, therefore, the correlation peak output S4 has the period L which is equal to that of the code generation timing signal S6 denoted by reference numeral 216. That is, the output S4 becomes a signal whose phase is advanced with respect to the code generation timing signal S6 by an amount Δ/2. Synchronization establishment and synchronization tracking can therefore be attained by inputting the correlation peak output S5 and the code generation timing signal S6 to the PLL 7.

According to this embodiment, since information conversion of a local reference-signal need not be performed, unlike in the prior art, no correlation peak signal is eliminated when the signals are out of phase, and synchronization can be established regardless of any initial phase differences.

Figure 4:
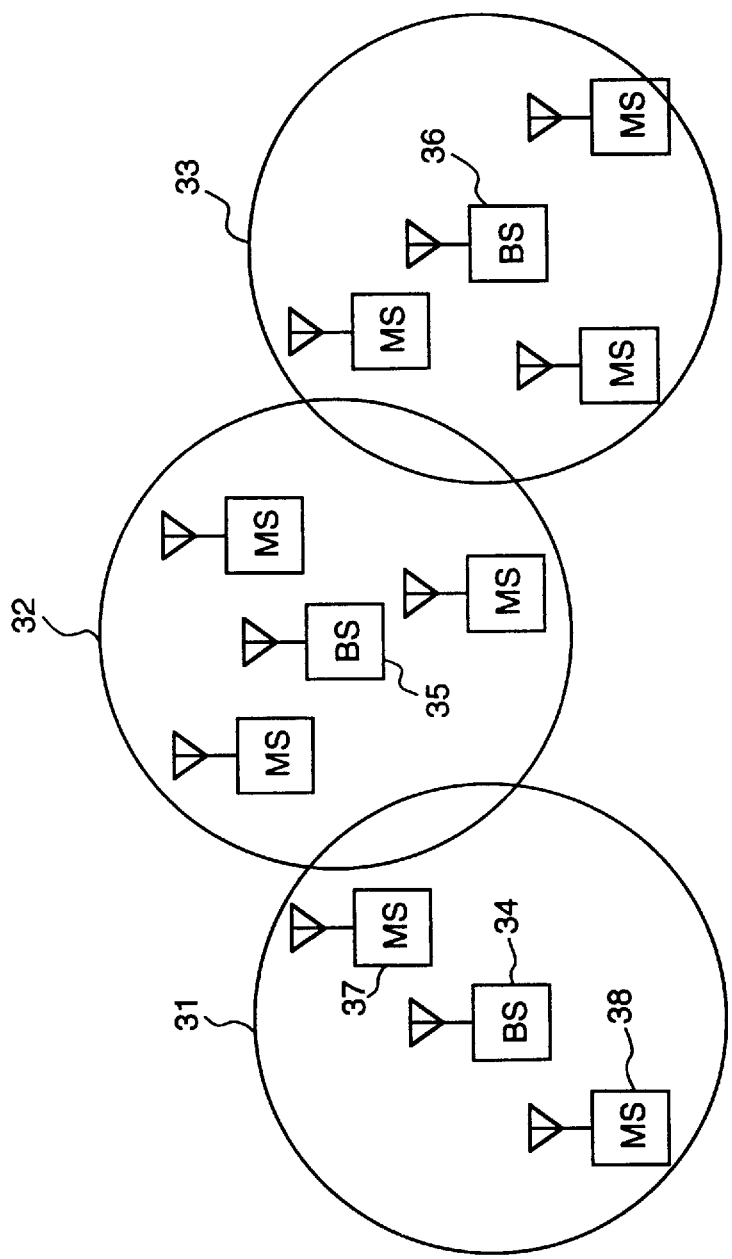
FIG. 4 is a view for explaining a multi-cell arrangement in a radio LAN system.

In addition, according to this embodiment, since the code sequence length of a sync spread signal is doubled, the process gain (indicating the degree of resistance to noise) is doubled. The distance characteristics are therefore improved by $2^{1/2}$ times. Assume that a radio LAN (local area network) system is to be formed by using spread spectrum communication. In this case, when the synchronization scheme of this embodiment is used in a multi-cell arrangement like the one shown in FIG. 4, code synchronization between a BS 34 and a BS 35 and between the BS 35 and a BS 36 can be established by using a sync signal having better distance characteristics than an information signal, thereby preventing interference between different cells.

<Second Embodiment>

Figure 5:
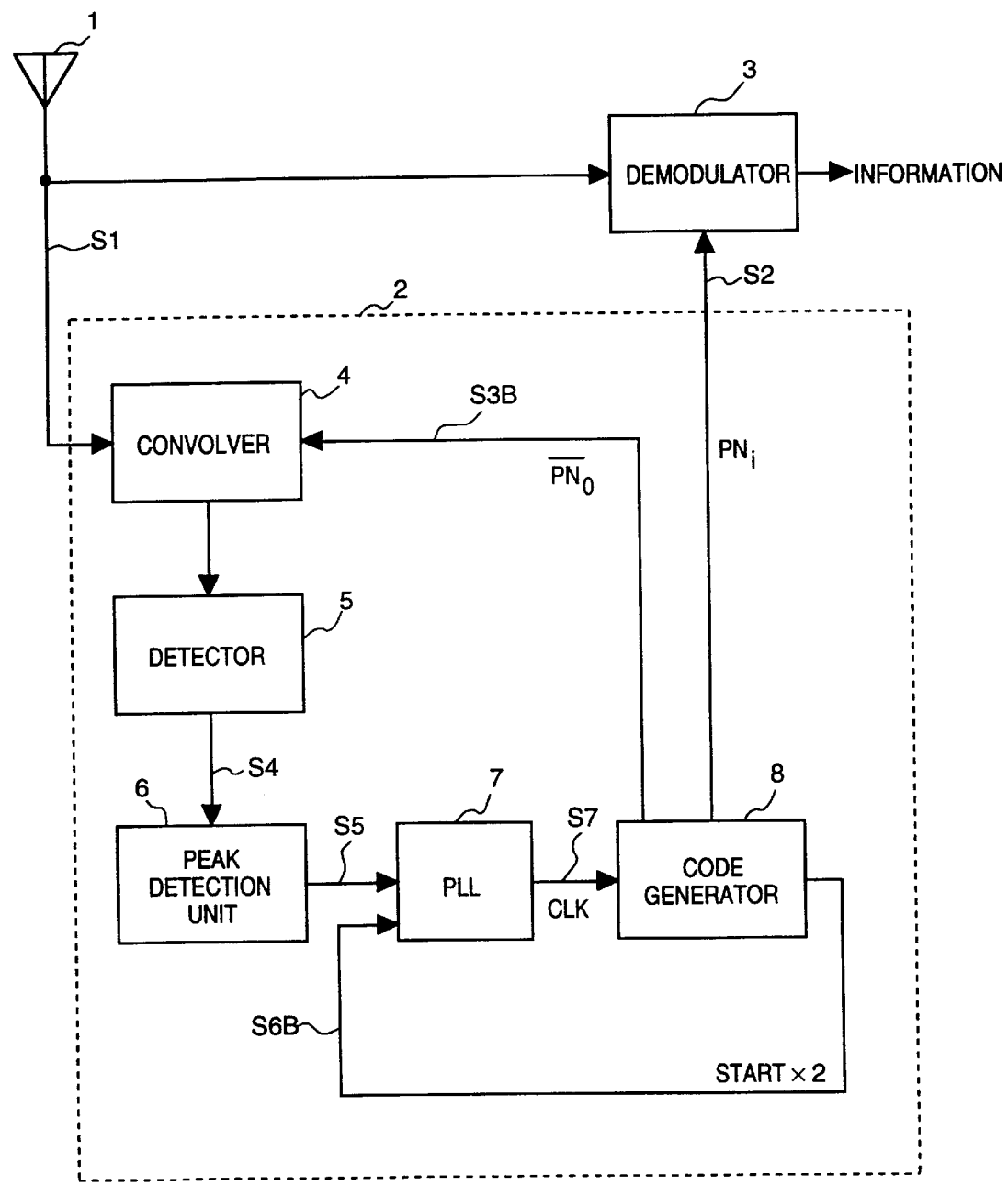
FIG. 5 is a block diagram showing the second embodiment of the present invention.

FIG. 5 is a block diagram showing the second embodiment of the present invention.

In the second embodiment, a code generation timing signal S6B is a signal having a period L/2, which indicates the start portions and the ½ positions of a S3B ($\overline{PN0}$).

A SAW convolver 4 performs correlation calculation between a received signal S1 and the local reference signal S3B. A PLL 7 adjusts the rate of a code generation clock S7 in accordance with the phase difference between a correlation peak signal S5 and the code generation timing signal S6B from a code generator 8.

Since the remaining arrangement in FIG. 5 is basically the same as that in the first embodiment (FIG. 1), a description thereof will be omitted.

Figure 6:
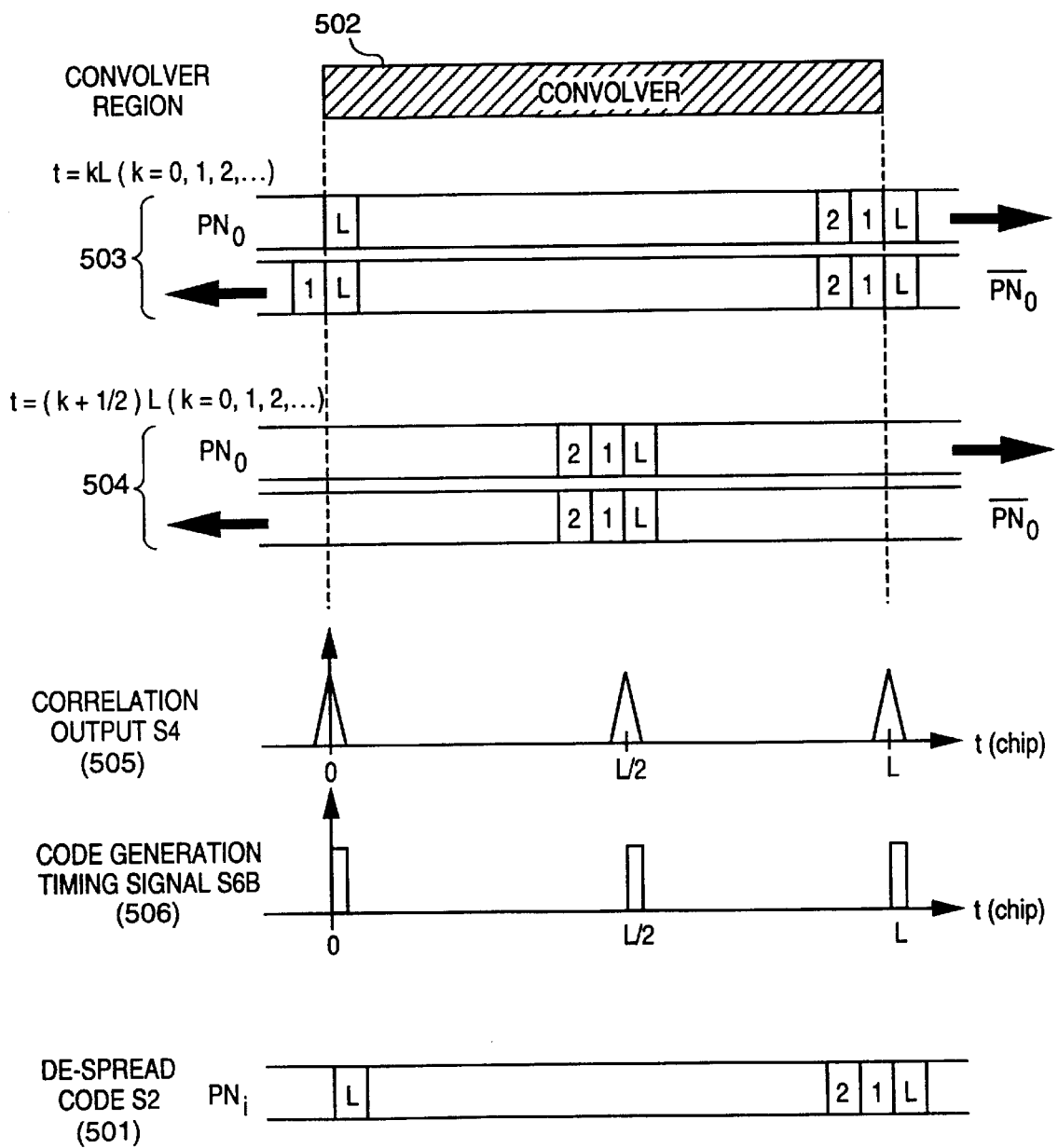
FIG. 6 is a timing chart showing the waveforms of signals in the second embodiment in a case wherein synchronization is established.

FIG. 6 is a timing chart showing the waveforms of signals for a synchronization scheme in the second embodiment.

Referring to FIG. 6, as indicated by reference numeral 502, the cross-correlation region of the SAW convolver 4 in this embodiment has a length L, which is equal to the code sequence length of a spread code (PN0, PNi). For the sake of descriptive convenience, the leading edge of the code generation timing signal S6 is represented by t=0.

As shown in FIG. 6, when the signals are in phase with each other, t=kL(k=0, 1, 2, . . . ), and the codes PN0 and $\overline{PN0}$ coincide with each other within the cross-correlation region of the SAW convolver 4, as indicated by reference numeral 503. In addition, as indicated by reference numeral 504, when t=(k+½)L, the codes PN0 and $\overline{PN0}$ coincide with each other within the cross-correlation region of the SAW convolver 4. The correlation peak output S4 can therefore be obtained at the period L/2, as indicated by reference numeral 505. That is, the output S4 becomes a signal having the same period as that of the code generation timing signal S6B denoted by reference numeral 506.

Figure 7:
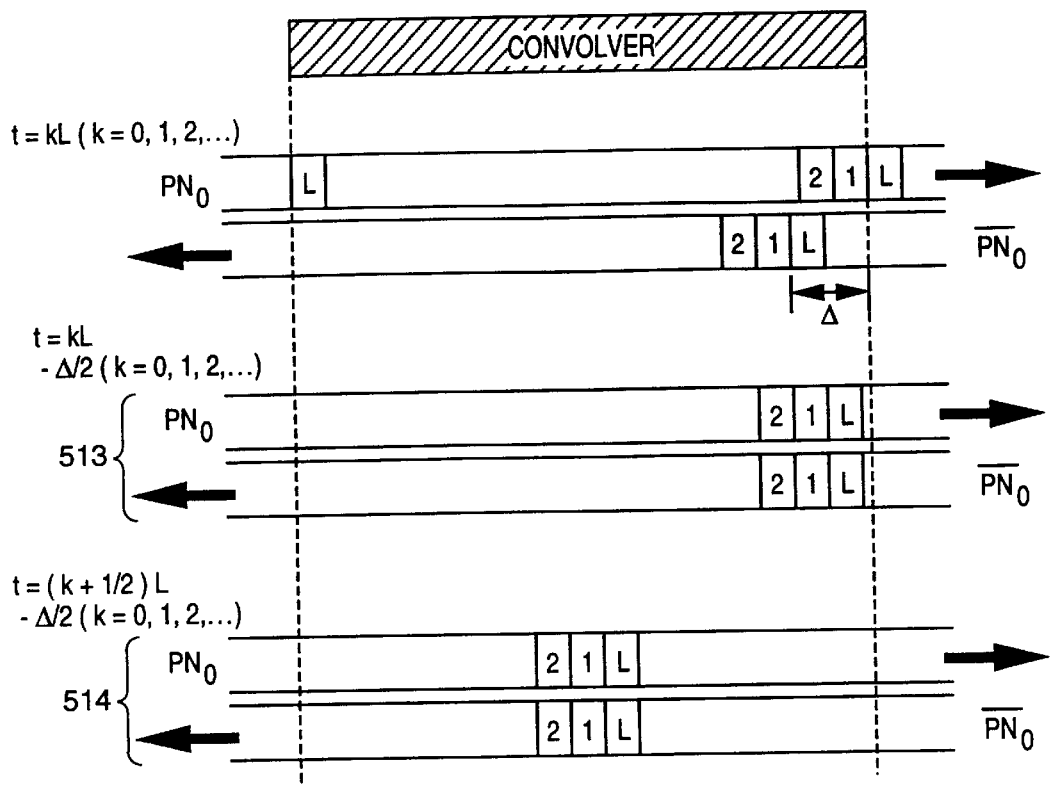
FIG. 7 is a timing chart showing the waveforms of signals in the second embodiment in a case wherein the signals are out of phase by an amount Δ.
Figure 7:
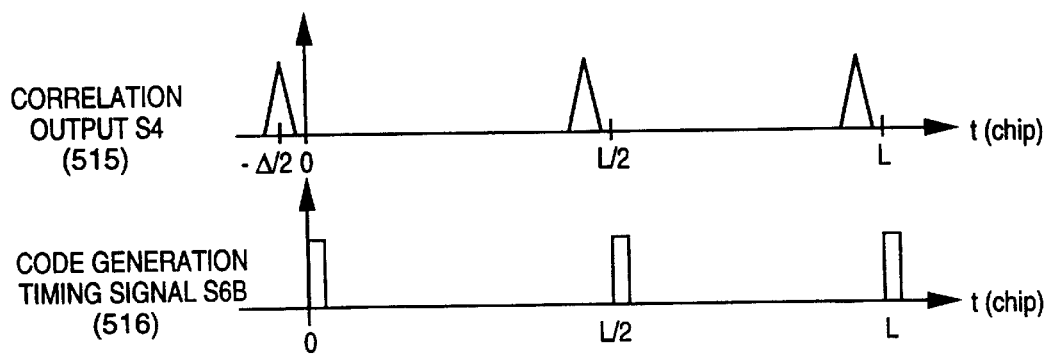
Figure 7:
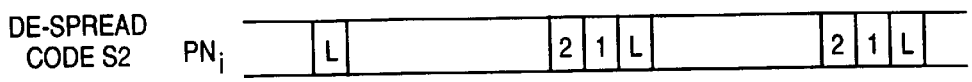

When the signals are out of phase by an amount Δ, as shown in FIG. 7, t=kL-Δ/2(k=0, 1, 2, . . . ), and hence the codes PN0 and $\overline{PN0}$ coincide with each other within the cross-correlation region of the SAW convolver 4, as indicated by reference numeral 513. In addition, as indicated by reference numeral 514, when t=(k+½)L-Δ/2, the codes PN0 and $\overline{PN0}$ coincide with each other within the cross-correlation region of the SAW convolver 4. As indicated by reference numeral 515, therefore, the correlation peak output S4 has the period L/2 which is equal to that of the code generation timing signal S6B denoted by reference numeral 516. That is, the output S4 becomes a signal whose phase is advanced with respect to the code generation timing signal S6B by an amount Δ/2.

Figure 8:
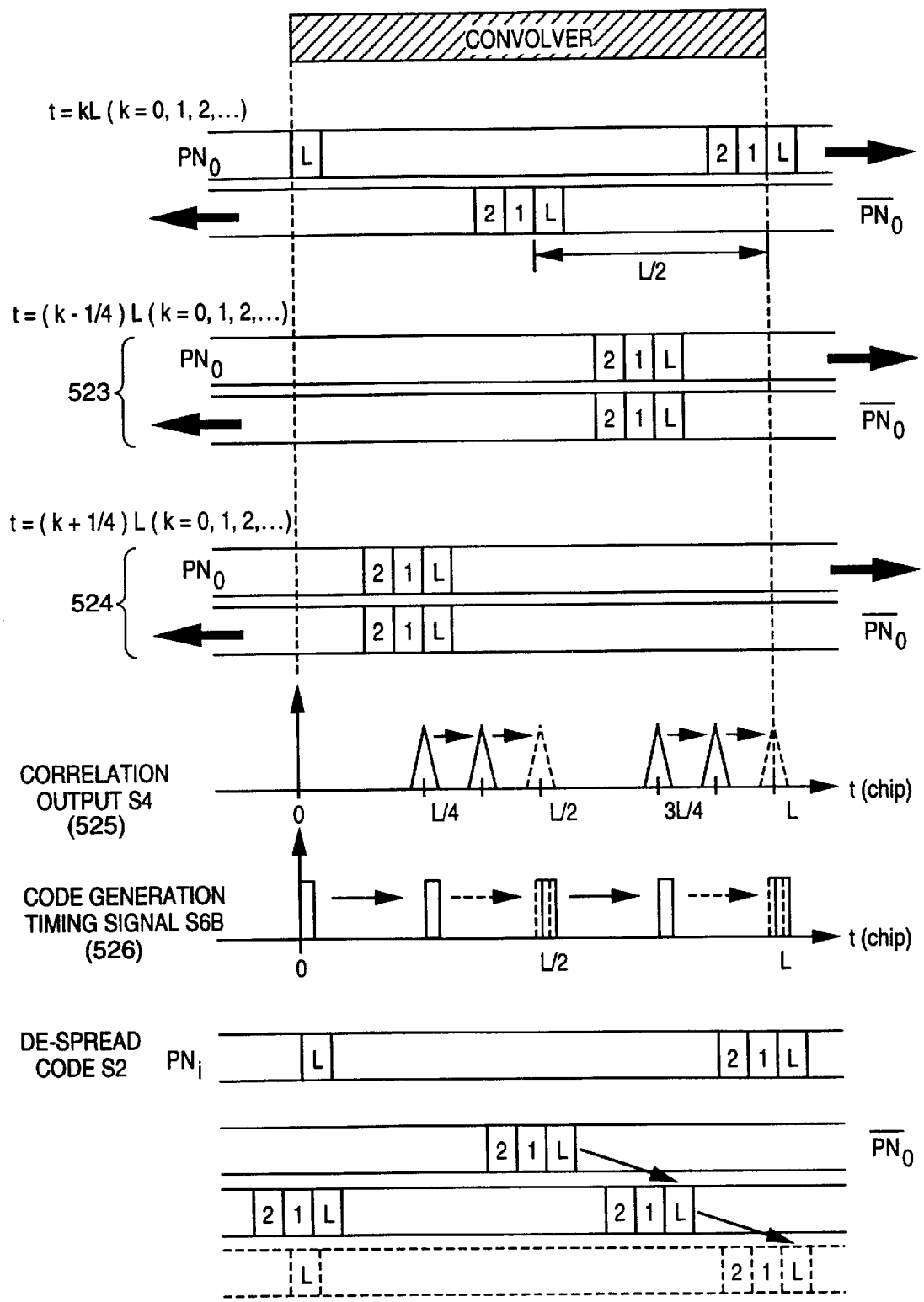
FIG. 8 is a timing chart showing the waveforms of signals in the second embodiment in a case wherein the signals are out of phase by an amount L/2.

When the signals are out of phase by an amount L/2, as shown in FIG. 8, t=(k-¼)L(k=0, 1, 2, . . . ), and hence the codes PN0 and $\overline{PN0}$ coincide with each other within the cross-correlation region of the SAW convolver 4, as indicated by reference numeral 523. In addition, as indicated by reference numeral 524, when t=(k+¼)L, the codes PN0 and $\overline{PN0}$ coincide with each other within the cross-correlation region of the SAW convolver 4. As indicated by reference numeral 525, therefore, the correlation peak output S4 has the period L/2 which is equal to that of the code generation timing signal S6B denoted by reference numeral 526. That is, the output S4 becomes a signal whose phase is shifted from the code generation timing signal S6B by an amount L/4.

When the code generation timing signal S6B having the period L/2 is out of phase by an amount L/2, it is regarded as an unstable signal with a phase lead or phase lag. As a result, locking to a correct code synchronization point is performed.

FIG. 8 shows how synchronization is established by regarding the code generation timing signal indicated by the broken lines as a signal with a phase lead with respect to the correlation peak signal indicated also by the broken lines.

When the phase of the generation timing signal is delayed by the PLL by a given amount, the correlation peak signal as the convolution result is also delayed by ½ the given amount. Consequently, as shown in FIG. 8, the phase of the correlation peak signal is locked to a correct code synchronization point. This also applies to the case wherein the code generation timing signal has a phase lag.

According to this embodiment, since information conversion of a local reference-signal need not be performed, unlike in the prior art, no correlation peak signal is eliminated when the signals are out of phase, and synchronization can be established regardless of any initial phase differences.

Figure 9:
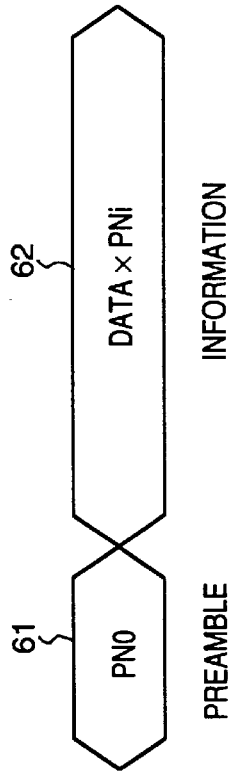
FIG. 9 is a view showing a transmission signal to be transmitted after information is formed into a frame.

In addition, according to this embodiment, since the frequency of a signal input to the PLL is twice that of a signal in the prior art, the time required for phase locking can be shorted to ½ that in the prior art without using any high-rate PLL. As shown in FIG. 9, therefore, in case of transmitting information as a frame, the preamble interval can be shortened by using the synchronization scheme of this embodiment. As a result, the throughput of the communication system can be improved.

<Third Embodiment>

Figure 10:
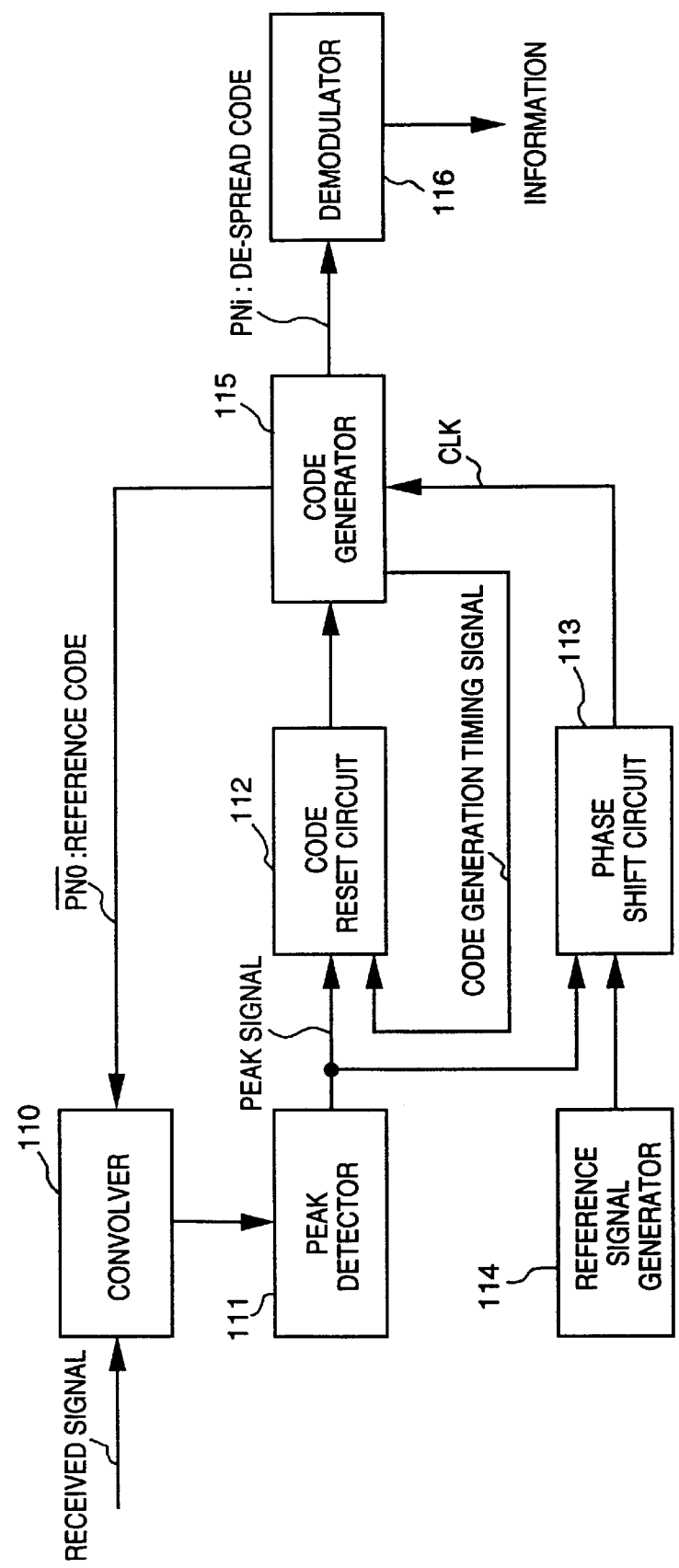
FIG. 10 is a block diagram showing the third embodiment of the present invention.

FIG. 10 is a block diagram showing the third embodiment of the present invention.

A code generator 115 generates a de-spread code PNi having a code sequence length L and a reference code $\overline{PN0}$ having a code sequence length 2L by using the same clock. A code generation timing signal indicates the start portion of the code sequence of the de-spread code PNi, and also indicates the start portion and the ½ position of a code sequence PN0 of a reference code.

A SAW convolver 110 as a correlation detector detects the correlation between a received IF (intermediate frequency) signal processed by a high-frequency unit and the reference spread code PN0 used for de-spread processing. The resultant correlation signal is digitized by a peak detector 111, and the digitized signal is then output to a code reset circuit 112 and a phase shift circuit 113.

When convolution correlation processing is to be performed by using the SAW convolver 110, the code reset circuit 112 outputs a code reset signal with a code phase obtained by doubling the phase lag of a peak signal with respect to a code generation timing of the reference spread code, thereby establishing code synchronization between the reference code and the de-spread code.

The phase shift circuit 113 outputs a signal coming from a reference-signal generator 114 as a code generator clock without any modification before starting a synchronizing operation. Upon starting reception and obtaining a peak signal, the phase shift circuit 113 shifts the reference clock by an amount obtained by doubling the phase lag of the peak signal with respect to the output clock from the reference signal generator 114, and outputs the shifted clock as a code generator clock, thereby establishing clock synchronization. Reference numeral 116 denotes a demodulator for de-spreading the received IF signal by using the de-spread code PNi to extract information.

Figure 11:
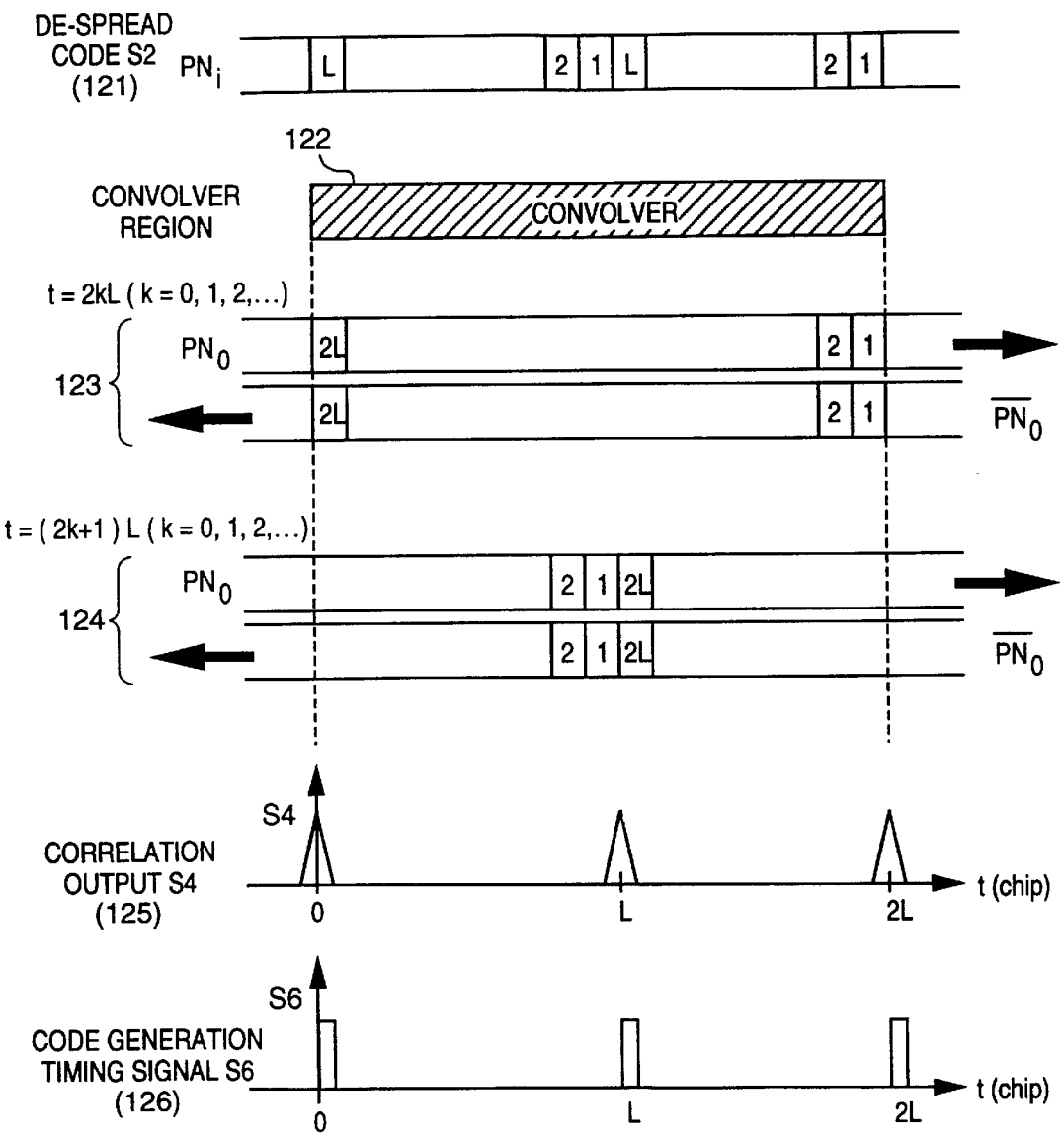
FIG. 11 is a timing chart showing the waveforms of signals in the third embodiment.

FIG. 11 is a timing chart showing the waveforms of signals for the synchronization scheme in the third embodiment.

The cross-correlation region of the convolver 110 in this embodiment has a length 2L, as indicated by reference numeral 122, with respect to a code sequence length L of a de-spread signal S2 denoted by reference numeral 121. For the sake of descriptive convenience, the leading edge of a code generation timing signal S6 is represented by t=0.

When the signals are in phase with each other, t=2kL (k=0, 1, 2, . . . ), and the codes PN0 and $\overline{PN0}$ coincide with each other within the cross-correlation region of the convolver, as indicated by reference numeral 123. In addition, as indicated by reference numeral 124, when t=(2k+1)L, the codes PN0 and $\overline{PN0}$ coincide with each other within the cross-correlation region of the convolver.

A correlation peak output S4 can therefore be obtained at the period L, as indicated by reference numeral 125. That is, the output S4 becomes a signal having the same period as that of the code generation timing signal S6 denoted by reference numeral 126. According to this embodiment, since information conversion of a local reference-signal need not be performed, unlike in the prior art, no correlation peak signal is eliminated when the signals are out of phase, and synchronization can be established regardless of any initial phase differences.

In addition, according to this embodiment, when the code sequence length of a sync pilot signal is doubled, the process gain is doubled. The distance characteristics are therefore be improved by $2_{1/2}$ times. Assume that a radio LAN system is to be formed by using spread spectrum communication. In this case, when the synchronization scheme of this embodiment is used in a multi-cell arrangement like the one shown in FIG. 4, code synchronization between a BS 34 and a BS 35 and between the BS 35 and a BS 36 can be established by using a sync signal having better distance characteristics than an information signal, thereby preventing interference between different cells.

<Fourth Embodiment>

Figure 12:
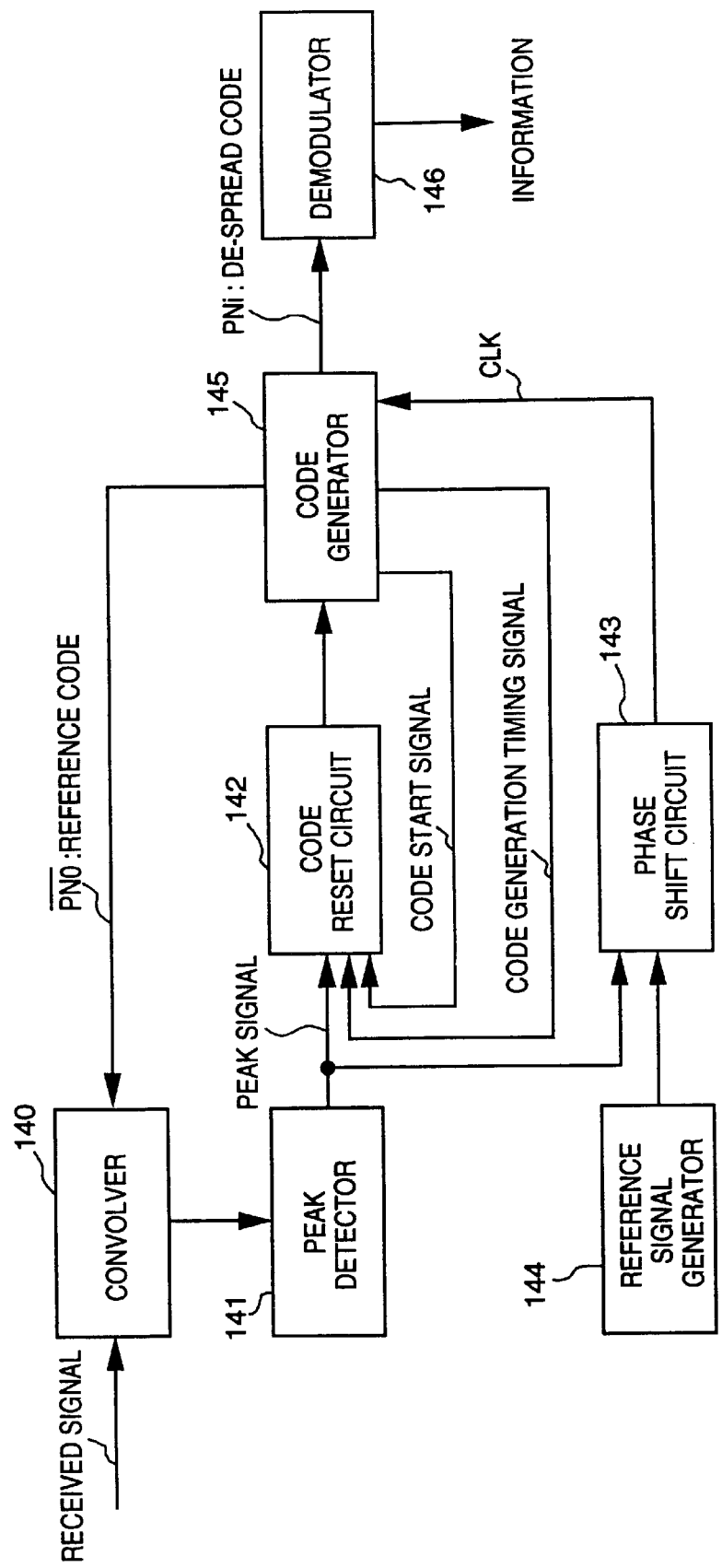
FIG. 12 is a block diagram showing the fourth embodiment of the present invention.

FIG. 12 is a block diagram showing the fourth embodiment of the present invention.

A code generator 145 generates a de-spread code PNi having a code sequence length L and a local reference code $\overline{PN0}$ by using the same clock. A code generation timing signal is a signal having a period L/2, which indicates the start portions and the ½ positions of the de-spread signal and the reference signal. A code start signal indicates the start portions of the de-spread code and the reference code.

Referring to FIG. 12, a SAW convolver 140 as a correlation detector detects the correlation between a received IF signal processed by a high-frequency unit and the reference spread code $\overline{PN0}$ used for de-spread processing. The resultant correlation signal is digitized by a peak detector 141. The resultant data is then output to a code reset circuit 142 and a phase shift circuit 143.

When convolution correlation processing is to be performed by using the SAW convolver 140, the code reset circuit 142 outputs a code reset signal by delaying the signal based on a code start signal, by a delay amount obtained by doubling the phase lag of a peak signal with respect to the code generation timing of the reference spread code, and resets the reference code and the de-spread code to establish code synchronization.

The phase shift circuit 143 outputs a signal coming from a reference-signal generator 144 as a code generator clock without any modification before a synchronizing operation. Upon starting reception and obtaining a peak signal, the phase shift circuit 143 shifts the reference clock by an amount obtained by doubling the phase lag of the peak signal with respect to the output clock from the reference-signal generator 144, and outputs the shifted clock as a code generator clock, thereby establishing clock synchronization. Reference numeral 146 denotes a demodulator for de-spreading the received IF signal by using the de-spread code PNi to extract information.

Figure 13:
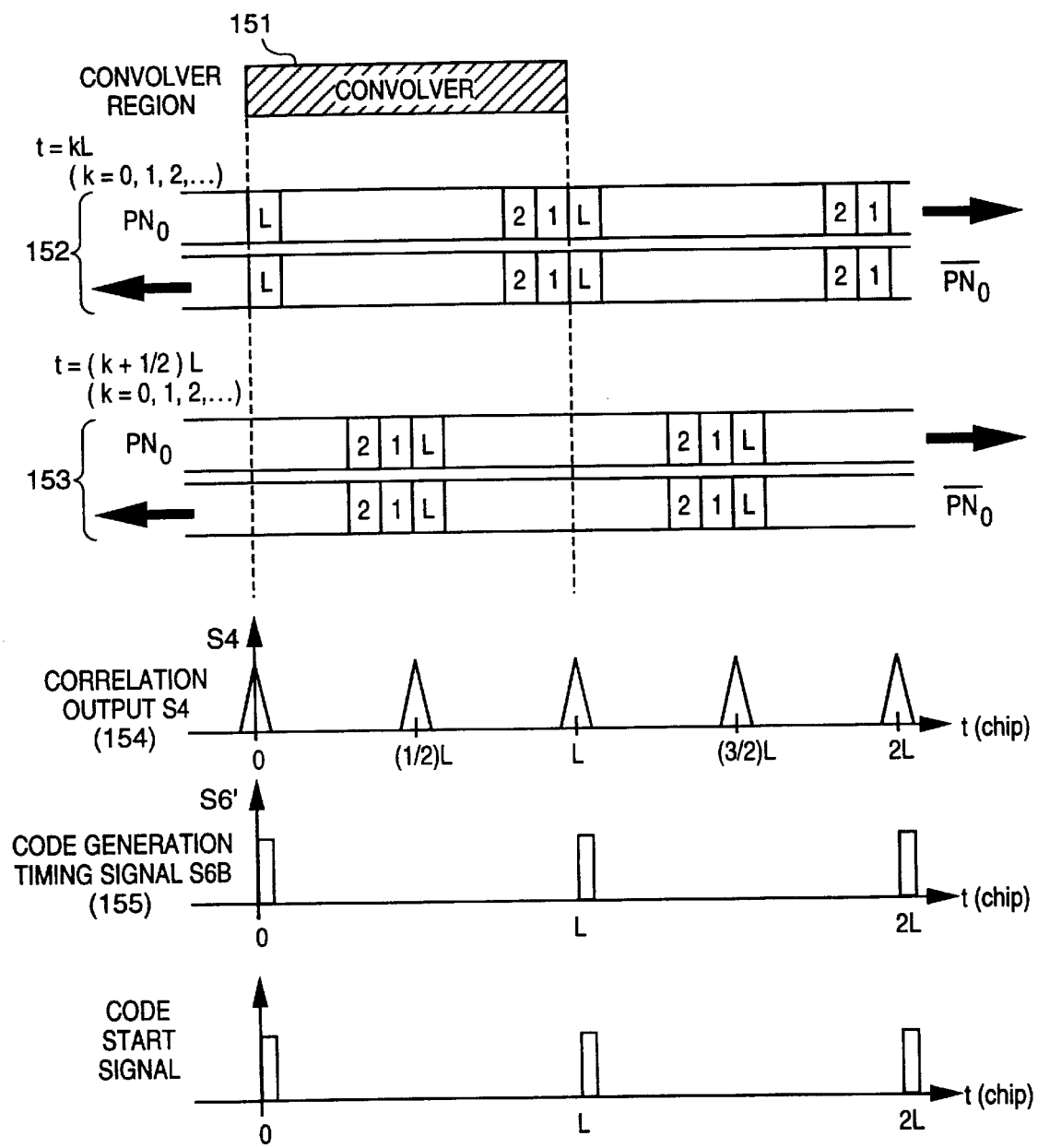
FIG. 13 is a timing chart showing the waveforms of signals for a synchronization scheme in the fourth embodiment.

FIG. 13 is a timing chart showing the waveforms of signals for the synchronization scheme in the fourth embodiment.

The cross-correlation region of the convolver in this embodiment has a length L which is equal to the code sequence length of a spread code, as indicated by reference numeral 151. For the sake of descriptive convenience, the leading edge of a code generation timing signal S6B is represented by t=0. When code synchronization is established, t=kL(k=0, 1, 2, . . . ), and codes PN0 and $\overline{PN0}$ coincide with each other within the cross-correlation region of the convolver, as indicated by reference numeral 152.

In addition, as indicated by reference numeral 153, when t=(k+½)L, the codes PN0 and $\overline{PN0}$ coincide with each other within the cross-correlation region of the convolver. Since a correlation peak output S4 can be obtained at a period L/2, as indicated by reference numeral 154, the output S4 becomes a signal having the same period as a code generation timing signal S6B indicated by reference numeral 155. According to this embodiment, since information conversion of a local reference-signal need not be performed, unlike in the prior art, no correlation peak signal is eliminated when the signals are out of phase, and synchronization can be established regardless of any initial phase differences.

Furthermore, according to this embodiment, since the frequency of a signal input to the code reset circuit 142 is twice as high as that of the prior art, the time required for synchronization establishment can be shortened to ½ that of the prior art. As shown in FIG. 9, therefore, when transmitting information as a frame, the preamble interval can be shortened by using the synchronization scheme of this embodiment. As a result, the throughput of the communication system can be improved.

<Fifth Embodiment>

Figure 14:
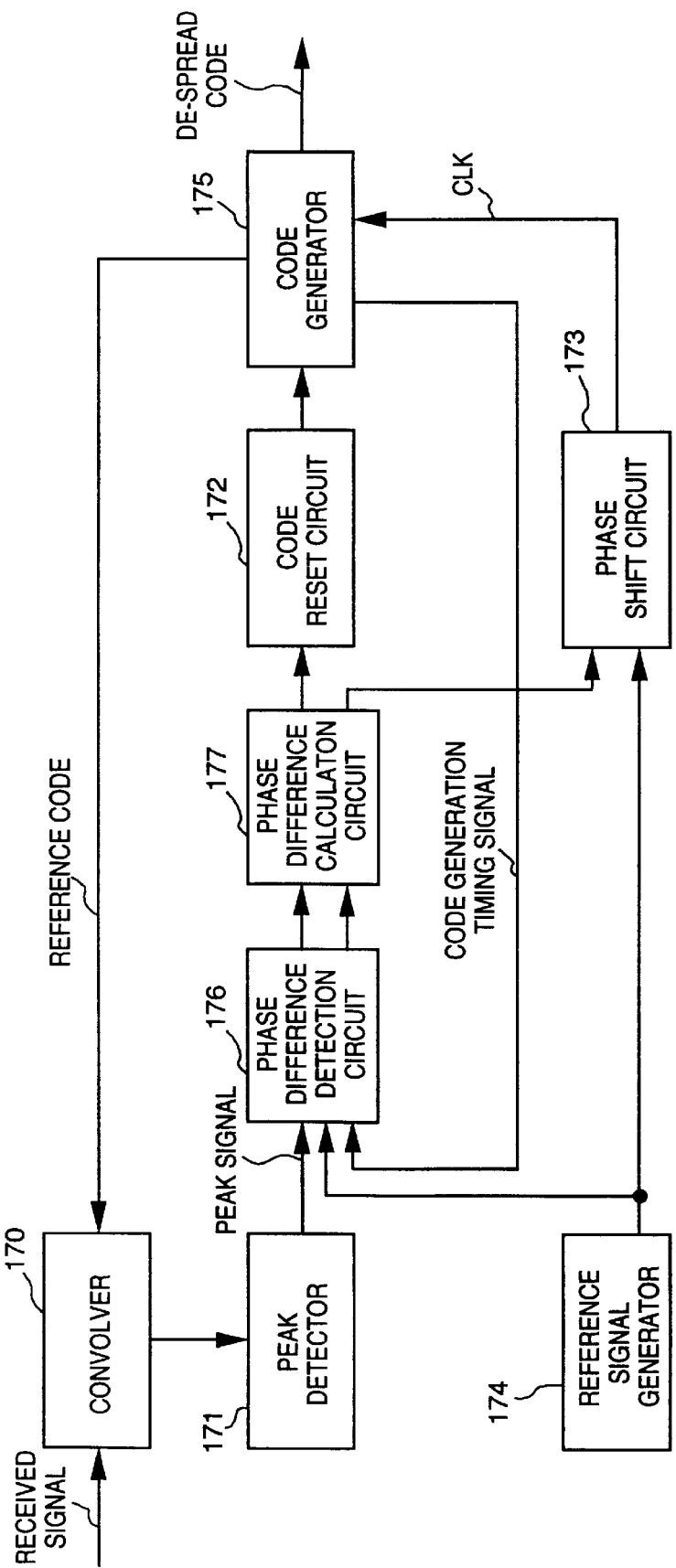
FIG. 14 is a block diagram showing the fifth embodiment of the present invention.
Figure 15:
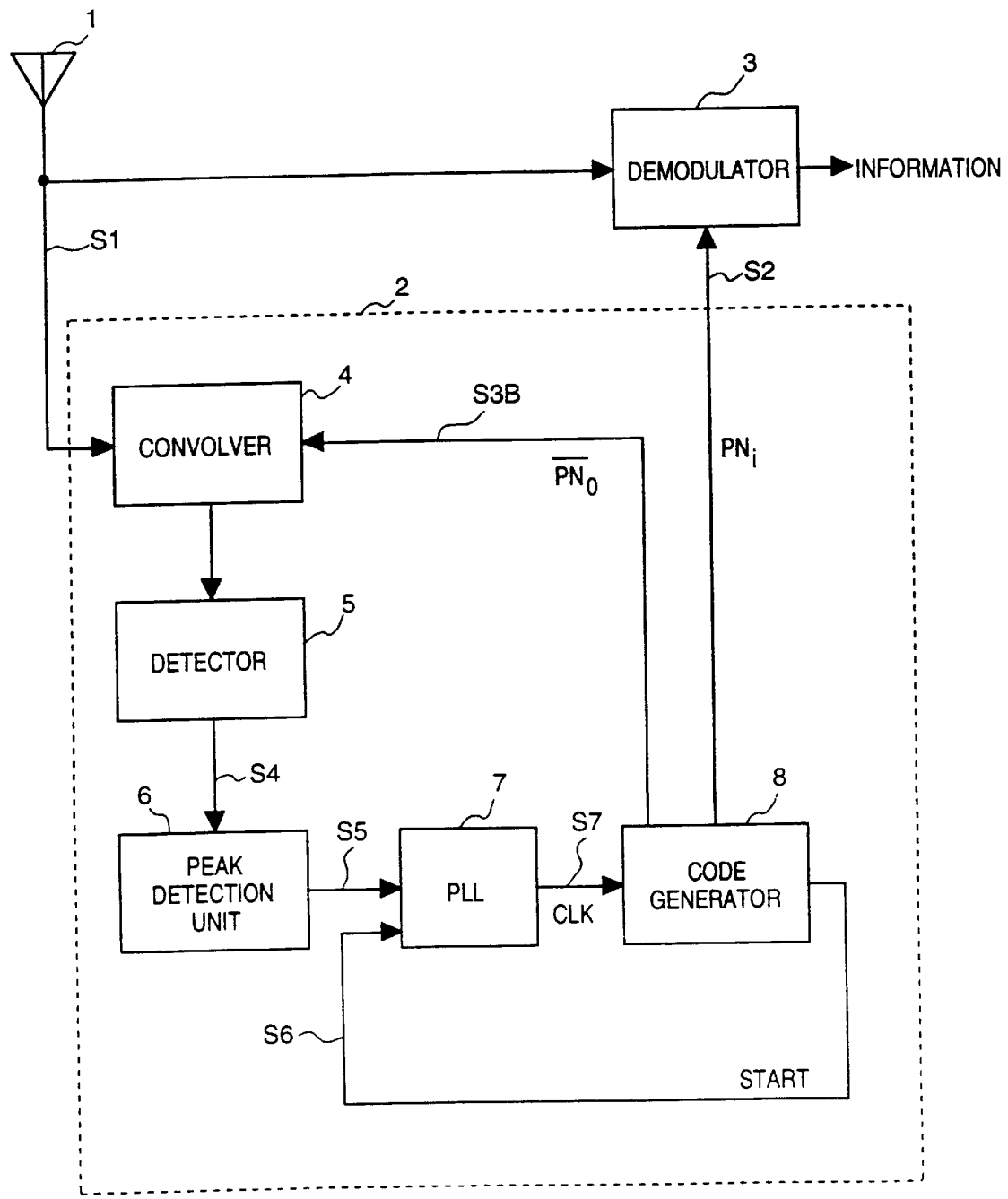
FIG. 15 is a block diagram showing a prior art.
Figure 16:
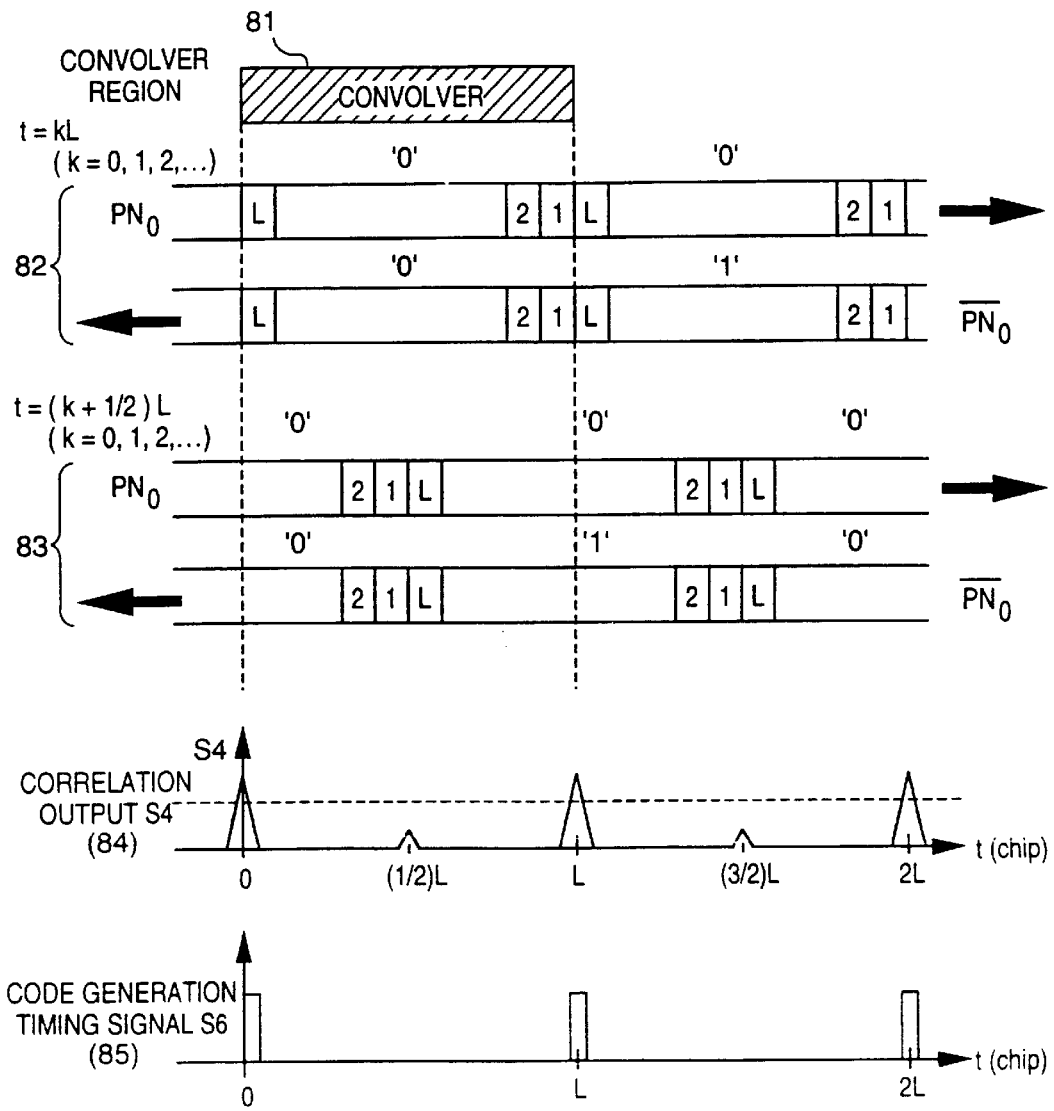
FIG. 16 is a timing chart showing the waveforms of signals in the prior art.
Figure 17:
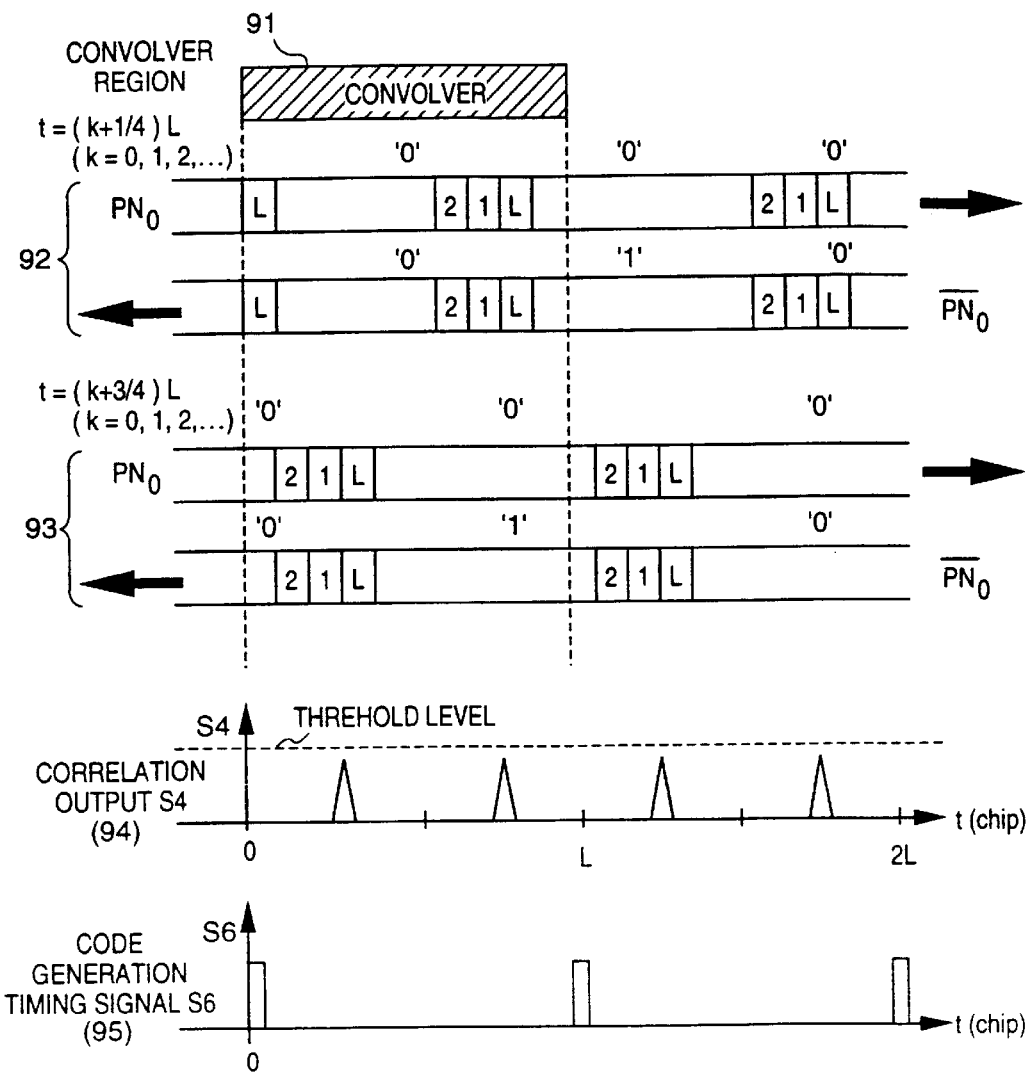
FIG. 17 is a timing chart showing the waveforms of signals in a locking operation in the prior art.

FIG. 14 is a block diagram showing the fifth embodiment of the present invention.

Referring to FIG. 14, a SAW convolver 170 as a correlation detector detects the correlation between a received IF signal processed by a high-frequency unit and a reference spread code used for de-spread processing. The resultant correlation signal is digitized by a peak detector 171, and the digitized signal is then output to a phase difference detection circuit 176.

The phase difference detection circuit 176 detects the phase difference between a peak signal output from the peak detector 171 and the code timing signal and the phase difference between an output clock from a reference frequency generator 174 and a peak signal a plurality of number of, times, and outputs the resultant data to a phase-difference calculation circuit 177. The above-mentioned number of times is generally set to be about two to five, although it changes depending on a situation.

The phase difference calculation circuit 177 calculates a phase of the code reset signal and the clock-phase shift amount by using an output from the phase-difference detection circuit 176.

In performing these calculations, for example, a plurality of detected phase differences may be averaged, or a most-frequent phase difference of a plurality of detected phase differences may be selected. When performing convolution correlation processing by using the SAW convolver 170, code resetting is performed by using a code phase obtained by doubling the phase difference calculated in this manner, and the clock is shifted by a clock-phase shift amount obtained by doubling the phase difference.

A code reset circuit 172 receives the code reset signal and establishes code synchronization between the reference code and the de-spread code.

A phase shift circuit 173 outputs a signal coming from the reference-signal generator 174 as a code generator clock without any modification before a synchronizing operation. Upon starting reception and obtaining a peak signal, the phase shift circuit 173 receives the clock-phase shift amount, shifts the peak signal from the reference clock, and outputs the resultant signal as a code generator clock, thereby establishing clock synchronization.

When a synchronization circuit which is based on digital processing is formed by using correlation signals obtained by the SAW convolver 170, various variation factors around the SAW convolver 170 average the jitters and the like of correlation peak signals themselves, thereby it is capable of realizing high-precision synchronization.

If a code generator 175 is used to generate a de-spread code PNi having a code sequence length L and a reference code $\overline{PN0}$ having a length 2L by using the same clock, as in the third embodiment, a peak signal generated by the peak detector 171 has the same period as that of a code generation timing signal of a reference code, as shown in FIG. 11. Even if, therefore, the phase-difference detection circuit 176 detects the peak signal and the code generation timing signal a plurality of times, the prolongation of the time required for synchronization seizure can be prevented.

As many apparently widely different embodiments of the present invention can be made without departing from the spirit and scope thereof, it is to be understood that the invention is not limited to the specific embodiments thereof except as defined in the appended claims.

What is claimed is:

1. A spread spectrum communication apparatus comprising:

generating means for generating a first code for synchronization and a second code having a period ½ a period of the first code; and communicating means for communicating a signal spread by using the second code.

2. The apparatus according to claim 1, wherein said communication means communicates the signal in synchronism with the first code.

3. A spread spectrum communication method comprising the steps of:

generating a first code for synchronization;

generating a second code having a period ½ a period of the first code; and communicating a signal spread by using the second code.

4. The method according to claim 3, wherein in the communicating step communication is performed in synchronism with the first code.

5. A spread spectrum apparatus comprising:

generating means for generating a reference code, said generating means further generating a timing signal having a period ½ a period of the reference code;

correlation means for obtaining correlation between a received signal and the reference code; and de-spread means for de-spreading the received signal in accordance with the timing signal and a correlation output from said correlation means.

6. The apparatus according to claim 5, wherein said generating means further generates a de-spread code having a period ½ the period of the reference code.

7. The apparatus according to claim 5, wherein said generating means further generates a de-spread code having the same period as that of the reference code.

8. The apparatus according to claim 5, wherein said de-spread means includes generating means for generating a clock having a frequency corresponding to a phase difference between the timing signal and the correlation output.

9. The apparatus according to claim 5, wherein said de-spread means includes reference-signal generating means for generating a reference signal, and shift means for shifting a phase of the reference signal in accordance with the timing signal and the correlation output.

10. The apparatus according to claim 5, wherein said correlation means includes a convolver.

11. A spread spectrum communication method comprising the steps of:

generating a reference code;

generating a timing signal having a period ½ a period of the reference code;

forming a correlation signal based on correlation between a received signal and the reference code; and de-spreading the received signal in accordance with the timing signal and the correlation signal.

12. The method according to claim 11, further comprising the step of generating a de-spread code having a period ½ the period of the reference code.

13. The method according to claim 11, further comprising the step of generating a de-spread code having the same period as that of the reference code.

14. The method according to claim 11, further comprising the step of generating a clock having a frequency corresponding to a phase difference between the timing signal and the correlation signal.

15. The method according to claim 11, further comprising the steps of:

generating a referencesignal; and shifting a phase of the reference signal in accordance with the timing signal and the correlation signal.

16. The method according to claim 11, wherein in said forming step the correlation signal is formed by a convolver.

17. A spread spectrum reception apparatus comprising:

code generating means for generating a reference code and a timing signal;

correlation means for calculating correlation between the reference code and a received signal;

reference-signal generating means for generating a reference signal;

detection means for detecting a phase difference between a correlation peak from said correlation means and the timing signal and a phase difference between the correlation peak and the reference signal a plurality of times;

calculation means for calculating a phase of a code reset signal and a clock-phase shift amount by using outputs from said detection means;

code reset means for resetting said code generating means in accordance with outputs from said calculation means; and phase shift means for shifting a phase of the reference signal in accordance with the outputs from said calculation means.

* * * * *

UNITED STATES PATENT AND TRADEMARK OFFICE
CERTIFICATE OF CORRECTION

PATENT NO. : 5,812,592

DATED : September 22, 1998

INVENTOR(S) : Suzuki, et al.

It is certified that error appears in the above-identified patent and that said Letters Patent is hereby corrected as shown below:

Column 2, line 25, delete "a correlation means for obtaining correlation" and insert --and de-spread means for de-spreading the--.

Column 2, line 26, between "signal accordance" insert --in--.

Column 2, line 27, insert the following paragraph, --In another aspect, the invention features a spread spectrum communication apparatus comprising generating means for generating a first code for synchronization and a second code having a period ½ a period of the first code, and communicating means for communicating a signal spread by using the second code.--

Column 4, line 36, after "...positions of a" insert --de-spread signal S2 (PNi) and a local reference signal--.

Claim 15, line 3, delete "referencesignal" insert --reference signal--.

Signed and Sealed this

Twelfth Day of January, 1999

Attest:

Attesting Officer

*Acting Commissioner of Patents and Trademarks*